US012071860B2

(12) United States Patent
Mote et al.

(10) Patent No.: US 12,071,860 B2
(45) Date of Patent: Aug. 27, 2024

(54) SYSTEM AND METHOD FOR ALIGNING CASING WALL OF TURBOMACHINE

(71) Applicant: General Electric Company, Schenectady, NY (US)

(72) Inventors: Kyle Vanceton Mote, Greenville, SC (US); Zachary James Taylor, Ponte Vedra Beach, FL (US); Maruthi Prasad Manchikanti, Kuala Lumpur (MY); Kyle Eric Benson, Greenville, SC (US); Kenneth Damon Black, Travelers Rest, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/709,389

(22) Filed: Mar. 30, 2022

(65) Prior Publication Data

US 2023/0313708 A1 Oct. 5, 2023

(51) Int. Cl.
*F01D 25/24* (2006.01)
*F01D 25/28* (2006.01)

(52) U.S. Cl.
CPC ........... *F01D 25/28* (2013.01); *F01D 25/243* (2013.01); *F05D 2230/644* (2013.01); *F05D 2260/38* (2013.01)

(58) Field of Classification Search
CPC ...... F01D 25/24; F01D 25/243; F01D 25/246; F01D 25/28; F01D 25/14; F05D 2260/38
See application file for complete search history.

(56) References Cited

U.S. PATENT DOCUMENTS

| | | | | |
|---|---|---|---|---|
| 3,937,589 | A * | 2/1976 | Remberg | F01D 25/265 415/214.1 |
| 5,603,510 | A * | 2/1997 | Sanders | F01D 11/025 415/173.3 |
| 6,244,819 | B1 * | 6/2001 | Voorhees | F01D 25/265 415/214.1 |
| 6,273,671 | B1 | 8/2001 | Ress, Jr. | |
| 6,431,555 | B1 | 8/2002 | Schroder et al. | |
| 8,967,951 | B2 * | 3/2015 | Klingler | F01D 25/246 415/214.1 |
| 9,624,933 | B2 | 4/2017 | Peer et al. | |
| 10,563,541 | B2 * | 2/2020 | Shirota | F16B 19/02 |

(Continued)

OTHER PUBLICATIONS

European extended search report for EP Application No. 23161154.2 dated Jul. 21, 2023, 8 pgs.

*Primary Examiner* — David E Sosnowski
*Assistant Examiner* — Maxime M Adjagbe
(74) *Attorney, Agent, or Firm* — Fletcher Yoder, P.C.

(57) ABSTRACT

A system includes a casing alignment system configured to align an inner wall with an outer wall of a multi-wall casing of a turbomachine having a rotor. The casing alignment system includes a first alignment positioner configured to bias a first lip of the inner wall in a direction of rotation of the rotor disposed within the multi-wall casing. The alignment positioner may include a spring, a fluid-driven alignment positioner, an electric-driven alignment positioner, or a combination thereof. The alignment positioner may be configured to bias the first lip within a first recess adjacent a first flanged coupling between first and second wall sections of the outer wall.

25 Claims, 7 Drawing Sheets

(56) References Cited

U.S. PATENT DOCUMENTS

| | | | | |
|---|---|---|---|---|
| 10,677,098 | B2 * | 6/2020 | Shirota ................. | F01D 25/246 |
| 2009/0232651 | A1 | 9/2009 | Ballard, Jr. et al. | |
| 2010/0050404 | A1 | 3/2010 | Ichiryu | |
| 2021/0355835 | A1 * | 11/2021 | Freeman ................. | F01D 11/08 |

* cited by examiner

SYSTEM AND METHOD FOR ALIGNING CASING WALL OF TURBOMACHINE

BACKGROUND

The present application relates generally to a system and method for aligning inner and outer walls of a casing of a turbomachine during operation of the turbomachine.

A turbomachine, such as a compressor or turbine, may include a multi-wall casing disposed about a central rotor having a plurality of rotary blades. The multi-wall casing may include inner and outer walls, such as an outer annular wall disposed about an inner annular wall. Unfortunately, during operation, the inner and outer walls of the multi-wall casing may move relative to one another, resulting in eccentricity or misalignment of axes between the inner and outer walls. For example, in response to torque applied due to rotation of the central rotor, flanges between segments of the outer wall may partially open, resulting in movement (e.g., downward movement) of the inner casing relative to the outer casing. The eccentricity may create problems with a clearance between the central rotor, particularly the rotary blades, and the inner wall. For example, as the eccentricity increases, the turbomachine may experience greater variability in the clearance circumferentially about a rotational axis of the turbomachine. The greater variability in the clearance may reduce the efficiency of the turbomachine and increase risk of a rub condition between the rotary blades and the inner wall.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes a casing alignment system configured to align an inner wall with an outer wall of a multi-wall casing of a turbomachine having a rotor. The casing alignment system includes a first alignment positioner configured to bias a first lip of the inner wall in a direction of rotation of the rotor disposed within the multi-wall casing.

In certain embodiments, a method includes aligning an inner wall with an outer wall of a multi-wall casing of a turbomachine via a casing alignment system, wherein the aligning includes biasing, via a first alignment positioner of the casing alignment system, a first lip of the inner wall in a direction of rotation of a rotor of the turbomachine disposed within the multi-wall casing.

In certain embodiments, a system may include a turbomachine having a rotor disposed within a multi-wall casing with an outer wall disposed about an inner wall. The outer wall has first and second wall sections coupled together at a first flanged coupling. The inner wall has first and second lips extending radially outward from the inner wall on diametrically opposite sides of the inner wall relative to a first plane extending through a rotational axis of the rotor, wherein load faces of the first and second lips are disposed on opposite sides of the first plane. The first lip extends radially into a first recess in the outer wall adjacent the first flanged coupling. The casing alignment system includes a first alignment positioner configured to bias the first lip of the inner wall in a direction of rotation of the rotor disposed within the multi-wall casing.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed systems are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide various alignment positioners of a casing alignment system configured to align inner and outer walls of a multi-wall casing of a turbomachine, such as a compressor, a turbine, or a combination thereof. The alignment positioners, which may include biasing adjusters such as springs, fluid-driven adjusters, and electric-driven adjusters, are configured to bias the inner wall to compensate for undesirable movement of the inner wall relative to the outer wall during operation of the turbomachine. For example, the alignment adjusters may compensate for a downward vertical movement of the inner wall by causing an upward movement on one side of the inner wall, thereby causing rotation of the inner wall to help realign the central axis of the inner wall with the central axis of the outer wall. Details of the casing alignment system are discussed in detail below with reference to the drawings.

Figure 1:
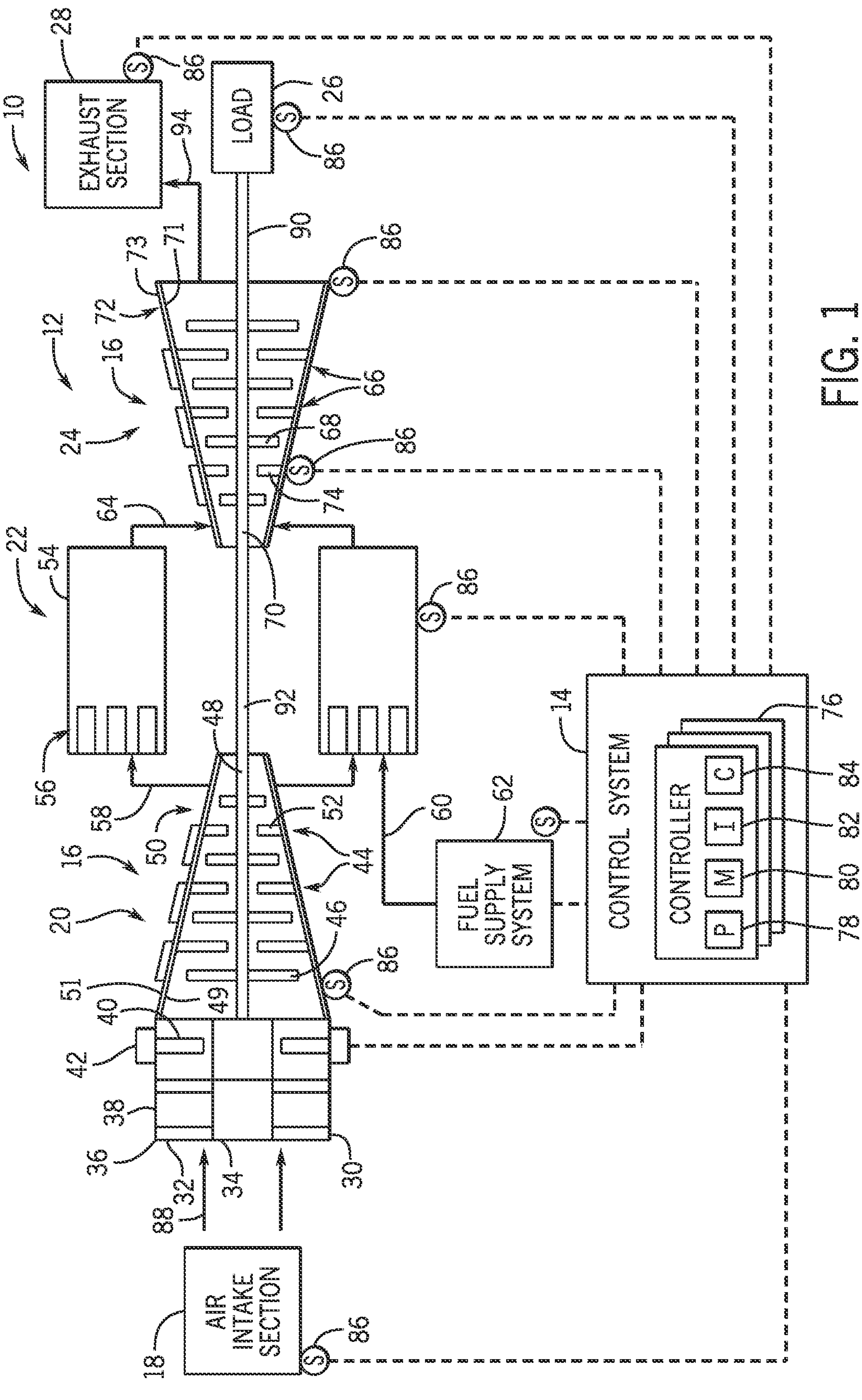
FIG. 1 is a schematic of an embodiment of a gas turbine system having a casing alignment system configured to align inner and outer walls of a multi-wall casing of a compressor section and/or a turbine section.

FIG. 1 is a block diagram of an embodiment of a gas turbine system 10 having a gas turbine engine 12 coupled to a control system 14. As discussed in further detail below, the gas turbine system 10 may include a casing alignment system 16. The various features of the casing alignment system 16 are discussed below with reference to FIGS. 1-11, and the various features may be used in any suitable combination with one another. However, before moving on to the casing alignment system 16, the gas turbine system 10 will be described as one possible turbomachine context for use of the casing alignment system 16.

The gas turbine engine 12 includes an air intake section 18, a compressor section 20, a combustor section 22, a turbine section 24, a load 26, and an exhaust section 28. The air intake section 18 may include a duct having one or more silencer baffles, fluid injection systems (e.g., heated fluid injection for anti-icing), air filters, or any combination thereof. The compressor section 20 may include an upstream inlet duct 30 having a bell mouth 32, wherein the inlet duct 30 includes an inner hub 34, an outer wall 36 disposed circumferentially about the inner hub 34 to define an air intake flow path, a plurality of stationary vanes 38 extending radially between the inner hub 34 and the outer wall 36 within the air intake flow path, and a plurality of inlet guide vanes (IGVs) 40 arranged circumferentially about a central axis within the air intake flow path. The inlet guide vanes 40 also may be coupled to one or more actuators 42, which are communicatively coupled to and controlled by the control system 14. In operation, the control system 14 is configured to adjust the position (e.g., angular position) of the inlet guide vanes 40 to vary the flow of intake air into the compressor section 20 during operation of the gas turbine engine 12.

The compressor section 20 includes one or more compressor stages 44, wherein each compressor stage 44 includes a plurality of compressor blades 46 coupled to a compressor shaft 48 within a compressor casing 50 (e.g., a multi-wall compressor casing having an outer wall 51 disposed about an inner wall 49), and a plurality of compressor vanes 52 coupled to the compressor casing 50 (e.g., inner wall 49). The compressor blades 46 and the compressor vanes 52 are arranged circumferentially about a central axis of the compressor shaft 48 within each compressor stage 44. The compressor stages 44 may include between 1 and 20 or more compressor stages. Additionally, the compressor stages 44 alternate between sets of the compressor blades 46 and sets of the compressor vanes 52 in the direction of flow through the compressor section 20. In operation, the compressor stages 44 progressively compress the intake air (represented by arrows 88) before delivery to the combustor section 22.

The combustor section 22 includes one or more combustors 54 each having one or more fuel nozzles 56. In certain embodiments, the combustor section 22 may have a single annular combustor 54 extending around a central axis of the gas turbine engine 12. However, in some embodiments, the combustor section 22 may include 2, 3, 4, 5, 6, or more combustors 54 spaced circumferentially about the central axis of the gas turbine engine 12. The fuel nozzles 56 receive compressed air 58 from the compressor section 20 and fuel 60 from a fuel supply system 62, mix the fuel and air, and ignite the mixture to create hot combustion gases 64, which then exit each combustor 54 and enter the turbine section 24.

The turbine section 24 includes one or more turbine stages 66, wherein each turbine stage 66 includes a plurality of turbine blades 68 arranged circumferentially about and coupled to a turbine shaft 70 inside of a turbine casing 72 (e.g., a multi-wall turbine casing having an outer wall 73 disposed about an inner wall 71), and a plurality of turbine vanes 74 arranged circumferentially about the turbine shaft 70. The turbine stages 66 may include between 1 and 10 or more turbine stages. Additionally, the turbine stages 66 alternate between sets of the turbine blades 68 and sets of the turbine vanes 74 in the direction of flow through the turbine section 24. In operation, the hot combustion gases 64 progressively expand and drive rotation of the turbine blades 68 in the turbine stages 66.

The load 26 may include an electrical generator, a machine, or some other driven load. The load 26 may be disposed at the hot end of the gas turbine engine 12 as illustrated in FIG. 1, or the load 26 may be disposed at the cold end of the gas turbine engine 12 (e.g., adjacent the compressor section 20). The exhaust section 28 may include an exhaust duct, exhaust treatment equipment, silencers, or any combination thereof. In some embodiments, the exhaust section 28 may include a heat exchanger, such as a heat recovery steam generator (HRSG) configured to generate steam to drive a steam turbine.

The control system 14 may include one or more controllers 76, each having a processor 78, memory 80, instructions 82 stored on the memory 80 and executable by the processor 78, and communications circuitry 84 configured to communicate with various sensors 86 (designated as "S") and actuators distributed throughout the gas turbine system 10. The sensors 86 may be coupled to and monitor conditions at the air intake section 18, the compressor section 20, the combustors 54 of the combustor section 22, the turbine section 24, the load 26, and the exhaust section 28. The control system 14 is configured to receive feedback from the sensors 86 to facilitate adjustments of various operating parameters of the gas turbine engine 12, such as the air intake flow, the fuel supply from the fuel supply system 62 to the combustors 54, operation of exhaust treatment equipment in the exhaust section 28, or any combination thereof. For example, the control system 14 may be configured to control the actuators 42 to change an angular position of the inlet guide vanes 40, thereby controlling the intake flow from the air intake section 18 into the compressor section 20.

In operation, the gas turbine system 10 receives air into the inlet duct 30 from the air intake section 18 as indicated by arrows 88, the inlet guide vanes 40 are controlled by the actuators 42 to adjust an angular position of the inlet guide vanes 40 for adjusting air flow into the compressor section 20, and the compressor section 20 is configured to compress the air flow being supplied into the combustor section 22. For example, each stage 44 of the compressor section 20 compresses the air flow with a plurality of the blades 46. The compressed air flow 58 then enters each of the combustors 54, where the fuel nozzles 56 mix the compressed air flow 58 with fuel 60 from the fuel supply system 62. The mixture of fuel and air is then combusted in each combustor 54 to generate the hot combustion gases 64, which flow into the turbine section 24 to drive rotation of the turbine blades 68 in each of the stages 66. The rotation of the turbine blades 68 drives rotation of the turbine shaft 70, which in turn drives rotation of the load 26 and the compressor section 20 via a shaft 90 coupled to the load 26 and a shaft 92 coupled to the compressor shaft 48. The turbine section 24 then discharges an exhaust gas 94 into the exhaust section 28 for final treatment and/or discharge into the environment.

As discussed in detail below, the multi-wall compressor casing 50 and/or the multi-wall turbine casing 72 may experiences changes (e.g., increases) in eccentricity during operation of the gas turbine system 10. The changes in eccentricity may be caused by torque, thermal expansion or contraction, or any combination thereof, during operation of the gas turbine system 10, resulting in relative movement between the inner walls (e.g., 49 or 71) and the outer walls (e.g., 51 or 73). For example, the outer walls (e.g., 51 or 73) may partially open at flanged connections between adjacent wall sections, thereby causing the inner walls (e.g., 49 or 71) to move relative to the outer walls (e.g., 51 or 73). The relative movement may include vertical movement (e.g., downward vertical movement) of the inner walls (e.g., 49 or 71) relative to the outer walls (e.g., 51 or 73), thereby causing misalignment between the central axes of the inner and outer walls (e.g., between 49 and 51 and between 71 and 73).

The casing alignment system 16 includes one or more alignment positioners 100 (see FIGS. 2-11) configured to help align the central axes of the inner and outer walls (e.g., between 49 and 51 and between 71 and 73) in a manner opposing the foregoing relative movement of the inner walls (e.g., 49 or 71) relative to the outer walls (e.g., 51 or 73). In certain embodiments, the alignment positioners 100 include mechanical springs (e.g., leaf springs, coil springs, Belleville washers, etc.), fluid-driven positioners (e.g., liquid or gas driven piston-cylinder positioners), electric-driven positioners (e.g., electric motor driven positioners), manual positioners (e.g., handwheel operated screw assembly), or any combination thereof. The mechanical springs automatically provide a biasing force to oppose the foregoing relative movement of the inner walls (e.g., 49 or 71) relative to the outer walls (e.g., 51 or 73). The manual positioners may be operated by a technician in response to sensor feedback from the sensors 86 and/or other observations by the technician. The fluid-driven positioners and the electric-driven positioners may be operated by the control system 14 in response to sensor feedback from the sensors 86.

In the illustrated embodiment, the control system 14 and the sensors 86 may be part of the casing alignment system 16. For example, the sensors 86 may monitor eccentricity, clearance between rotating and stationary components, vibration, strain, torque, position (e.g., angular position, vertical position, or horizontal position), or other parameters indicative of relative movement between inner and outer walls of a multi-wall casing of the compressor section 20 and/or the turbine section 24 (e.g., inner and outer walls 49 and 51 of the multi-wall compressor casing 50 and inner and outer walls 71 and 73 of the multi-wall turbine casing 72). The sensors 86 may be disposed at a plurality of axial positions along a rotational axis of the gas turbine system 10, and a plurality of circumferential positions about the rotational axis. For example, at one or more stages 44 and 66, the sensors 86 may be disposed at one or more locations corresponding to positions of the blades (e.g., 46 and 68) and/or vanes (e.g., 52 and 74). The sensors 86 may monitor relative movement between the inner and outer walls (e.g., 49, 51, 71, and 73) by monitoring a change in distance between the inner and outer walls at various circumferential positions about the axis, a change in distance between the inner and outer walls relative to a reference structure, or a combination thereof. Additionally, the sensors 86 may monitor relative movement between the inner and outer walls (e.g., 49, 51, 71, and 73) by monitoring a change in clearance between the respective inner wall and the rotating blades (e.g., 46 and 68) at various circumferential positions about the axis. Additionally, the sensors 86 may monitor a torque and/or a rotational speed of the compressor section 20 and/or the turbine section 24 as an indication of a torque-induced movement and/or a speed-induced movement between the inner and outer walls (e.g., 49, 51, 71, and 73).

The control system 14 is configured to analyze sensor data from the sensors 86, to determine relative movement between the inner and outer walls (e.g., 49, 51, 71, and 73), to output data indicative of the relative movement to an electronic display, and/or to trigger an alarm (e.g., an audio and/or visual alarm) if the relative movement exceeds one or more thresholds. The control system 14 also may be configured to control one or more of the alignment positioners 100 of the casing alignment system 16 to adjust an alignment between the inner and outer walls (e.g., 49, 51, 71, and 73), such as by causing an opposite relative movement between the inner and outer walls (e.g., 49, 51, 71, and 73) to increase alignment between the inner and outer walls (e.g., 49, 51, 71, and 73). The opposite relative movement may correspond to a horizontal movement, a vertical movement, and/or a rotational movement of the inner wall (e.g., 49 or 71) relative to the outer wall (e.g., 51 or 73), wherein the opposite relative movement is generally opposite to the relative movement caused by operation of the gas turbine system 10 (e.g., torque-induced movement or speed-induced movement).

In some embodiments, the casing alignment system 16 automatically responds to changes in the relative position of the inner and outer walls (e.g., 49, 51, 71, and 74) without a control action by the control system 14, such as by using mechanical springs as the alignment positioners 100. However, the casing alignment system 16 may include alignment positioners 100 (e.g., fluid-driven positioners and electric-driven positioners) directly controlled by the control system 14 to improve alignment between the central axes of the inner and outer walls (e.g., 49, 51, 71, and 73). Various features of the casing alignment system 16 are discussed in further detail below.

Figure 2:
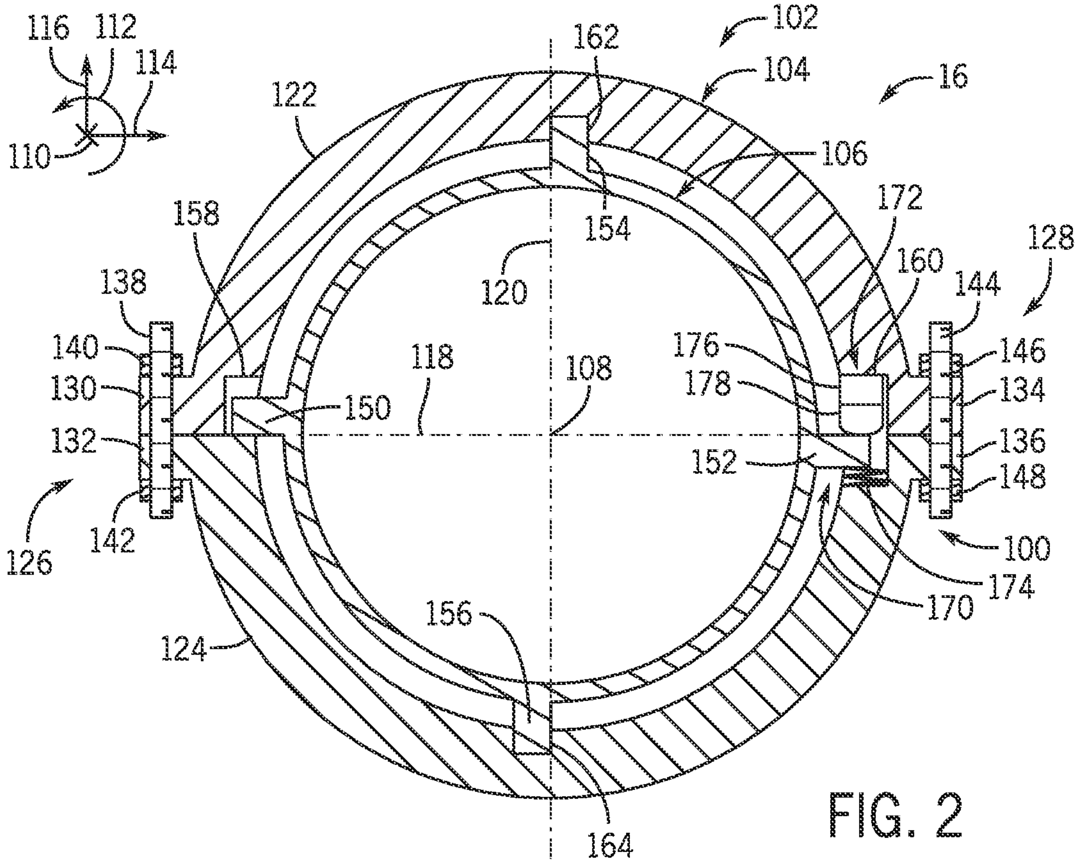
FIG. 2 is a cross-sectional axial view of a multi-wall casing having the casing alignment system of FIG. 1 in a cold condition, illustrating an alignment positioner having a biasing adjuster with a spring disposed in a recess at a flanged coupling.

FIG. 2 is a cross-sectional view of an embodiment of a multi-wall casing 102 having the alignment positioner 100 of the casing alignment 16 as discussed above with reference to FIG. 1. In the illustrated embodiment, the multi-wall casing 102 includes an outer wall 104 disposed about an inner wall 106. The multi-wall casing 102 having the outer and inner walls 104 and 106 may correspond to the multi-wall compressor casing 50 having the inner and outer walls 49 and 51 and/or the multi-wall turbine casing 72 having the inner and outer walls 71 and 73. Accordingly, the following discussion referring to the multi-wall casing 102 is applicable to the multi-wall compressor and turbine casings 50 and 72 of FIG. 1.

As illustrated in FIG. 2, the outer and inner walls 104 and 106 may be annular walls disposed about a central axis 108, which may correspond to a rotational axis of a turbomachine such as the gas turbine system 10 of FIG. 1. Additionally, the following discussion refers to various positions and orientations of the components. Accordingly, reference may be made to an axial direction or axis 110 along the central axis 108, a circumferential direction or axis 112 disposed circumferentially about the central axis 108, and one or more radial directions or axes relative to the central axis 108. For example, the radial directions or axes may correspond to a horizontal direction or axis 114 and a vertical direction or axis 116. Furthermore, the components of the multi-wall casing 102 may correspond to a first plane 118 and a second plane 120, which are generally perpendicular to one another. In certain embodiments, the first plane 118 is a horizontal plane extending along the central axis 108 and the horizontal direction or axis 114, and the second plane 120 is a vertical plane extending along the central axis 108 and the vertical direction or axis 116.

The outer wall 104 includes a plurality of wall sections coupled together at flange couplings, such as wall sections 122 and 124 coupled together at flanged couplings 126 and 128. For example, each of the wall sections 122 and 124 may define a semi-cylindrical section of an annular shaped outer wall 104. The flanged coupling 126 includes flanges 130 and 132 extending radially outward from the respective wall sections 122 and 124, while the flanged coupling 128 includes flanges 134 and 136 extending radially outward from the respective wall sections 122 and 124. The flanged coupling 126 has a plurality of threaded fasteners coupling together the flanges 130 and 132, such as a male threaded fastener 138 extending through the flanges 130 and 132 and secured by female threaded fasteners 140 and 142 adjacent the respective flanges 130 and 132. The female threaded fasteners 140 and 142 may be threaded onto the male threaded fastener 138, thereby compressing the flanges 130 and 132 together at the flanged coupling 126. Similarly, the flanged coupling 128 includes a plurality of male threaded fasteners 144 extending through the flanges 134 and 136, while female threaded fasteners 146 and 148 secure the male threaded fastener 144 about the flanges 134 and 136. In particular, the female threaded fasteners 146 and 148 may be threaded onto the male threaded fastener 144, thereby compressing the flanges 134 and 136 together at the flanged coupling 128. In certain embodiments, the flanged couplings 126 and 128 may be secured to one another by other removable fasteners and/or fixed couplings, such as welded joints, clamps, brazed joints, dovetail joints, hinged joints, or any combination thereof.

The inner wall 106 may include a single annular structure, a plurality of inner wall segments coupled together at flanged connections, or another suitable configuration. Additionally, the inner wall 106 includes a plurality of radial protrusions or lips configured to interface with the outer wall 104. In the illustrated embodiment, the inner wall 106 includes radial protrusions or lips 150, 152, 154, and 156, which are disposed in respective recesses 158, 160, 162, and 164 in the outer wall 104. The lips 150 and 152 are disposed in the respective recesses 158 and 160, while the lips 154 and 156 are disposed in the respective recesses 162 and 164. The lips 150 and 152 and recesses 158 and 160 are disposed generally along the first plane 118, which corresponds to the horizontal direction or axis 114.

In the illustrated embodiment, the lips 150 and 152 are disposed on diametrically opposite sides of the inner wall 106 relative to the plane 118 extending through the central axis 108 of the rotor (e.g., the lips 150 and 152 are asymmetric relative to the plane 118), while the lips 154 and 156 are disposed on diametrically opposite sides of the inner wall 106 relative to the plane 120 extending through the central axis 108 of the rotor (e.g., the lips 154 and 156 are asymmetric relative to the plane 120). The lips 154 and 156 and recesses 162 and 164 are disposed generally along the second plane 120, which corresponds to the vertical direction or axis 116. However, in the illustrated embodiment, the lip 150 and the recess 158 are disposed above the plane 118, whereas the lip 152 and the recess 160 are disposed below the plane 118 (e.g., rotationally opposite sides of the plane 118). Similarly, the lip 154 and the recess 162 are disposed on one side of the plane 120, whereas the lip 156 and the recess 164 are disposed on the opposite side of the plane 120 (e.g., rotationally opposite sides of the plane 120).

In the illustrated embodiment, a bottom surface (or load face) of the lip 150 is disposed along the plane 118 while a top surface (or load face) of the lip 152 is disposed along the plane 118, and a left hand surface (or load face) of the lip 154 is disposed along the plane 120 while a right hand surface (or load face) of the lip 156 is disposed along the plane 120. In some embodiments, the foregoing arrangement of top, bottom, left hand, and right hand surfaces (or load faces) may be reversed, such as in configurations with an opposite rotational direction of the rotor. In the illustrated configuration, the multi-wall casing 102 is in a cold or non-operating configuration, such that the multi-wall casing 102 is configured to adjust for changes during operation of the gas turbine system 10.

At the flanged coupling 128, the multi-wall casing 102 includes the alignment positioner 100 configured to help align the inner wall 106 relative to outer wall 104 in response to positional changes or movements during operation of the gas turbine system 10. For example, the alignment positioner 100 includes a biasing adjuster 170 disposed between the lip 152 and the lower surface of the recess 160 (e.g., below the lip 152) and a shim assembly 172 disposed between the lip 152 and the upper surface of the recess 160 (e.g., above the lip 152). The biasing adjuster 170 may include one or more springs 174, such as a leaf spring, a coil spring, a Belleville washer, or any combination thereof. Additionally, the biasing adjuster 170 may include a fluid-driven adjuster (e.g., a gas or liquid driven piston-cylinder assembly), an electric-driven adjuster, or any combination thereof.

The shim assembly 172 may include a plurality of shims, such as one or more grindable shims 176 and a crowned shim 178 (e.g., shim having a curved or crowned surface, such as a convex surface). The shim assembly 172 is configured to adjust a position of the lip 152 relative to the recess 160 (e.g., during construction and assembly). For example, the grindable shims 176 may be adjusted in thickness by grinding the surface of the grindable shims 176, thereby helping to provide a better fit between the shim assembly 172 and the recess 160 and to provide a desired position of the inner wall 106 relative to the outer wall 104 (e.g., with lips 150 and 152 on opposite upper and lower sides of the plane 118).

The biasing adjuster 170 is configured to provide an opposite force to bias the lip 152 (e.g., a biasing force) toward the shim assembly 172. As discussed in further detail below, the biasing adjuster 170 of the alignment positioner 100 is configured to provide the biasing force to ensure proper alignment between the inner wall 106 and the outer wall 104 during operation of the gas turbine system 10. For example, the biasing adjuster 170 may help to bias the inner wall 106 to move (e.g., vertically and/or rotationally) relative to the outer wall 104, thereby helping to align the outer and inner walls 104 and 106.

Figure 3:
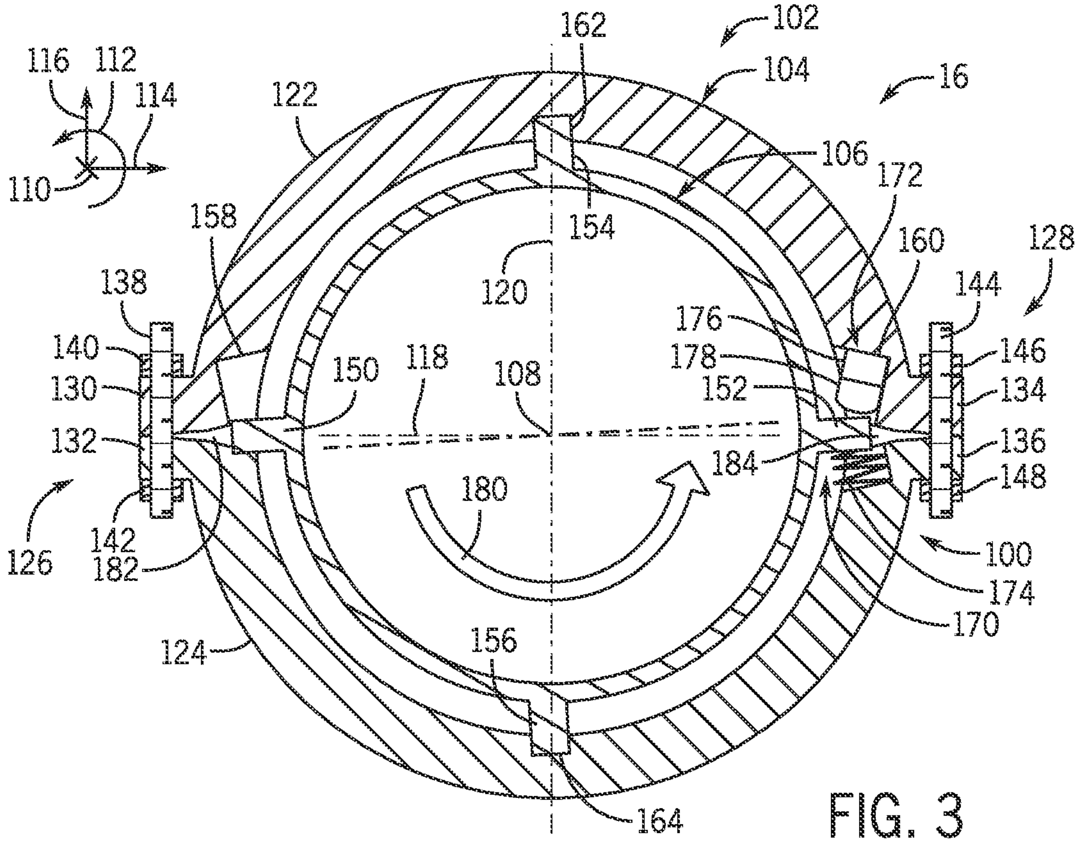
FIG. 3 is cross-sectional axial view of the multi-wall casing having the casing alignment system of FIG. 2 in an operating condition, illustrating the alignment positioner biasing movement (e.g., upward and/or rotational movement) of the inner wall to improve alignment between the inner and outer walls of the multi-wall casing.

FIG. 3 is a cross-sectional view of the multi-wall casing 102 of FIG. 2, further illustrating changes in the multi-wall casing 102 and the alignment positioner 100 of the casing alignment system 16 during operation of the gas turbine system 10. In particular, during operation of the gas turbine system 10, a torque may be applied to the multi-wall casing 102 as indicated by arrow 180 as a result of rotational motion of the rotor within the compressor section 20 or the turbine section 24. As torque is applied to the gas turbine system 10, the outer wall 104 may experience a partial opening or separation at the flanged coupling 126 and 128, as illustrated by openings or separations 182 and 184 at the flanged couplings 126 and 128. As a result of the openings or separations 182 and 184, the lips 150 and 152 may experience some downward vertical movement relative to the outer wall 104.

As the inner wall 106 moves downwardly in the recesses 158 and 160 due to the openings 182 and 184, the alignment positioner 100 of the casing alignment system 16 helps to bias the inner wall 106 to rotate in the same direction as the applied torque as indicated by arrow 180, thereby helping to overcome or compensate for the downward vertical movement of the inner wall 106. Without the disclosed alignment positioner 100 of the casing alignment system 16, the inner wall 106 may move vertically downward due to the openings 182 and 184, causing a misalignment between central axes of the outer wall 104 and the inner wall 106. Rather than allowing this misalignment or eccentricity, the alignment positioner 100 of the casing alignment system 16 biases the lip 152 to move upward in a rotational direction along with the direction of torque 180. As a result, the alignment positioner 100, particularly the biasing adjuster 170 including the spring 174, forces the lip 152 and the inner wall 106 to rotate sufficiently to align the central axis of the outer and inner walls 104 and 106 relative to the central axis 108. Although the alignment positioner 100 of FIGS. 2 and 3 includes a spring 174 as the biasing adjuster 170, the alignment positioner 100 may include any one or more types of biasing adjusters 170, including the spring 174, a fluid-driven biasing adjuster, an electric-driven biasing adjuster, a manual biasing adjuster, or any combination thereof.

Figure 4:
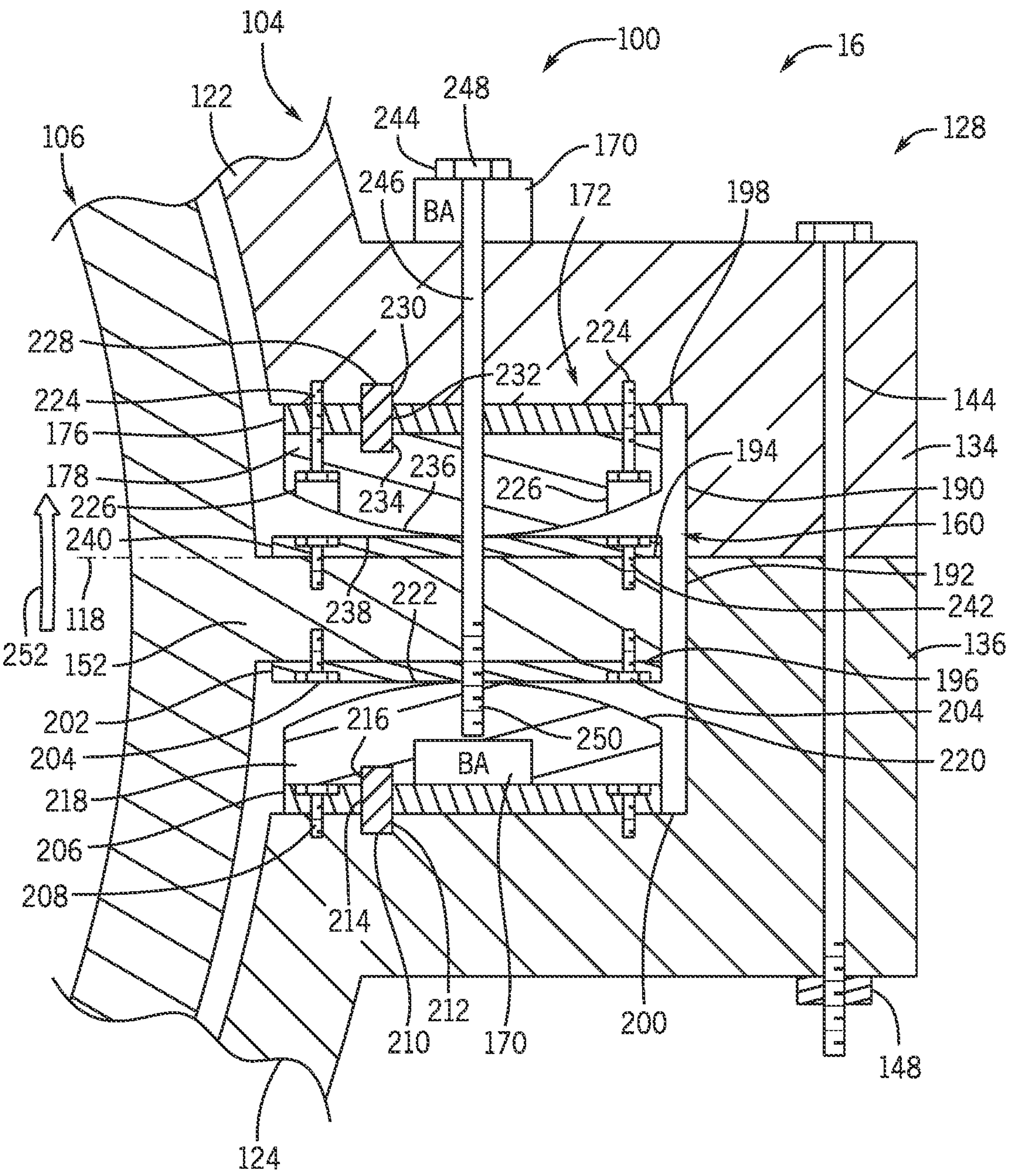
FIG. 4 is a partial cross-sectional axial view of the multi-wall casing of FIG. 2, further illustrating details of the alignment positioner at the flanged coupling, including internal and external biasing adjusters of the alignment positioner.

FIG. 4 is a partial cross-sectional view of the multi-wall casing 102 of FIG. 2, further illustrating details of the casing alignment system 16 at the flanged coupling 128 between the outer and inner walls 104 and 106. In the illustrated embodiment, the alignment positioners 100 of the casing alignment system 16 include a plurality of the biasing adjusters 170 (labeled "BA"), which may include one or more types and/or configurations of biasing adjusters 170 as discussed in detail below. As further illustrated, the biasing adjusters 170 may be disposed partially inside and partially outside of the recess 160 between the flanges 134 and 136 of the flanged coupling 128.

In the illustrated embodiment, the recess 160 has a recess portion 190 disposed in the flange 134 and an opposing recess portion 192 disposed in the flange 136. However, the recess 160 may be disposed in a single flange, a symmetric arrangement in the flanges 134 and 136, or any other configuration at the flanged coupling 128. The flanges 134 and 136 are coupled together with a plurality of threaded fasteners, such as male threaded fasteners 144 (e.g., threaded bolts) and corresponding female threaded fasteners 148 (e.g., threaded nuts). However, the flanges 134 and 136 may be coupled together with a variety of removable fasteners and/or fixed joints, such as welded joints, brazed joints, clamps, hinges, or any combination thereof. As further illustrated in FIG. 4, the lip 152 extends radially into the recess 160 and is generally disposed below the plane 118. For example, the lip 152 includes opposite upper and lower surfaces 194 and 196, which face opposite upper and lower surfaces 198 and 200 of the recess 160.

A variety of features and components are disposed in the recess portion 192. For example, in the recess portion 192, the lip 152 includes a wear plate 202 coupled to the lower surface 196 via one or more fasteners 204, such as male threaded fasteners or bolts. The recess portion 192 includes a grindable shim 206 coupled to the lower surface 200 via one or more fasteners 208, such as male threaded fasteners or bolts. The grindable shim 206 may be ground along one or more of its surfaces during assembly of the turbomachine (e.g., gas turbine system 10) to provide a better fit and proper alignment of the lip 152 in the recess 160. The grindable shim 206 also may be aligned relative to the lower surface 200 via one or more alignment keys 210, which extend into corresponding recesses 212, 214, and 216 in the flange 136, the grindable shim 206, and a crowned shim 218. The crowned shim 218, which is disposed between the grindable shim 206 and the wear plate 202, includes a crowned or curved contact surface 220 (e.g., convex surface) configured to contact a generally flat surface of the wear plate 202. The recess portion 192 also may include a biasing adjuster 170 disposed between the grindable shim 206 and the crowned shim 218.

Similarly, a variety of features and components are disposed in the recess portion 190. For example, in the recess portion 190, the shim assembly 172 includes the grindable shim 176 and the crowned shim 178 coupled to the upper surface 198 via one or more threaded fasteners, such as threaded fasteners or bolts 224. The fasteners 224 may be recessed into the crowned shim 178 at recesses 226, wherein the fasteners 224 extend through bores in the crowned shim 178 and the grindable shim 176 into the flange 134. The shim assembly 172 also may include one or more alignment keys 228, which extend through corresponding recesses 230, 232, and 234 in the flange 134, the grindable shim 176, and the crowned shim 178. Similar to the crowned shim 218, the crowned shim 178 includes a crowned or curved contact surface 236 (e.g., a convex surface) configured to contact the corresponding flat surface 238 of a wear plate 240 coupled to the upper surface 194 of the lip 152. The wear plate 240 may be coupled to the lip 152 with a plurality of fasteners 242, such as male threaded fasteners or bolts.

During assembly and calibration of the gas turbine system 10, the grindable shims 176 and 206 may be partially ground to reduce the thicknesses, thereby helping to adjust the position of the lip 152 within the recess 160. For example, the grindable shims 176 and 206 may be ground sufficiently to position the upper surface 194 of the lip 152 directly along the plane 118, while the lower surface 196 of the lip 152 is disposed at an offset vertically below the plane 118.

As noted above, the alignment positioners 100 of the casing alignment system 16 include a plurality of the biasing adjusters 170. In addition to the biasing adjuster 170 at the crowned shim 218, the alignment positioners 100 may include a biasing adjuster 170 disposed outside of the flanged coupling 128 at the flange 134. As illustrated, the casing alignment system 16 includes an alignment positioner 100 with a biasing adjuster 170 disposed below a head 244 of a shaft 246 coupled with the crowned shim 218. For example, the head 244 and the shaft 246 may be parts of a male threaded fastener 248, such as a male threaded bolt. The shaft 246 may be coupled to the crowned shim 218 via male threads 250 or another suitable mechanical connection.

In operation, the biasing adjusters 170 disposed inside and outside of the recess 160 may be configured to bias the lip 152 in a rotational or vertically upward direction 252, which corresponds to the direction of the torque 180 as illustrated in FIG. 3. Accordingly, as the flanged couplings 126 and 128 partially open to create the openings 182 and 184, causing the inner wall 106 to move vertically downward within the outer wall 104, the biasing adjusters 170 of the casing alignment system 16 are configured to move the lip 152 in the direction 252 to help align the inner wall 106 within the outer wall 104. This alignment generally improves or matches the alignment between the central axes of the outer and inner walls 104 and 106. Although FIG. 4 illustrates two biasing adjusters 170, the casing alignment system 16 may include any number of alignment positioners 100 with biasing adjusters 170 at various locations along the flanged coupling 128.

Figure 5:
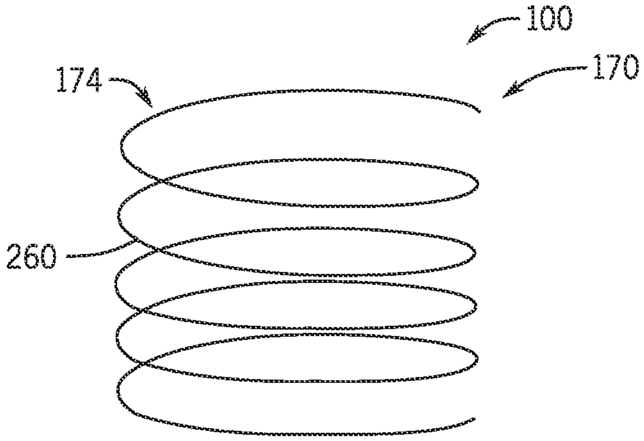
FIG. 5 is a schematic view of an embodiment of the biasing adjuster of the alignment positioner of the casing alignment system of FIGS. 1-4, illustrating the biasing adjuster including a spring (e.g., a coil-shaped spring)

FIGS. 5-9 are schematics of embodiments of the biasing adjusters 170 of the alignment positioner 100 of the casing alignment system 16 as illustrated and described above with reference to FIGS. 1-4. FIG. 5 is a schematic of an embodiment of the biasing adjuster 170 including the spring 174. In the illustrated embodiment, the spring 174 includes a coil shaped spring 260. The coil shaped spring 260 may include 1, 2, 3, 4, 5, 6, 7, 8, 9, 10, or more loops defining a spiral or helical pattern. In certain embodiments, the alignment positioner 100 may include any number of the springs 174 (e.g., coil shaped springs 260) arranged in series and/or parallel with one another.

Figure 6:
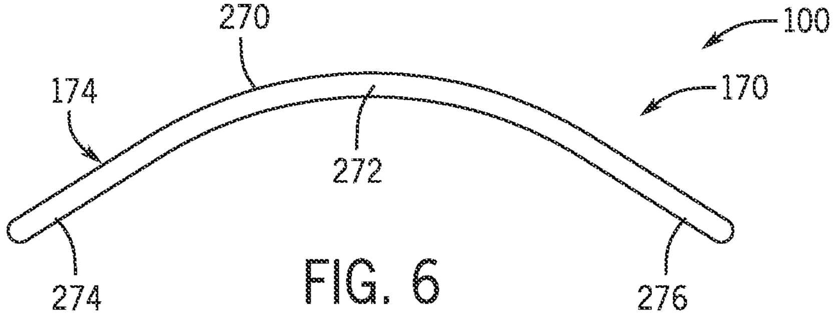
FIG. 6 is a schematic view of an embodiment of the biasing adjuster of the alignment positioner of the casing alignment system of FIGS. 1-4, illustrating the biasing adjuster including a spring (e.g., a leaf spring)

FIG. 6 is a schematic of an embodiment of the biasing adjuster 170 of the alignment positioner 100, further illustrating an embodiment of the spring 174. As illustrated, the spring 174 includes a leaf spring 270 having a curved plate 272 extending between opposite ends 274 and 276. The curved plate 272 may have a radius selected to provide a desired spring force for the biasing adjuster 170. In certain embodiments, the alignment positioner 100 may include any number of the springs 174 (e.g., leaf springs 270) arranged in series and/or parallel with one another. For example, the spring 174 may include a plurality of the leaf springs 270 stacked one over another in a series arrangement, e.g., as a plurality of leaf spring layers.

Figure 7:
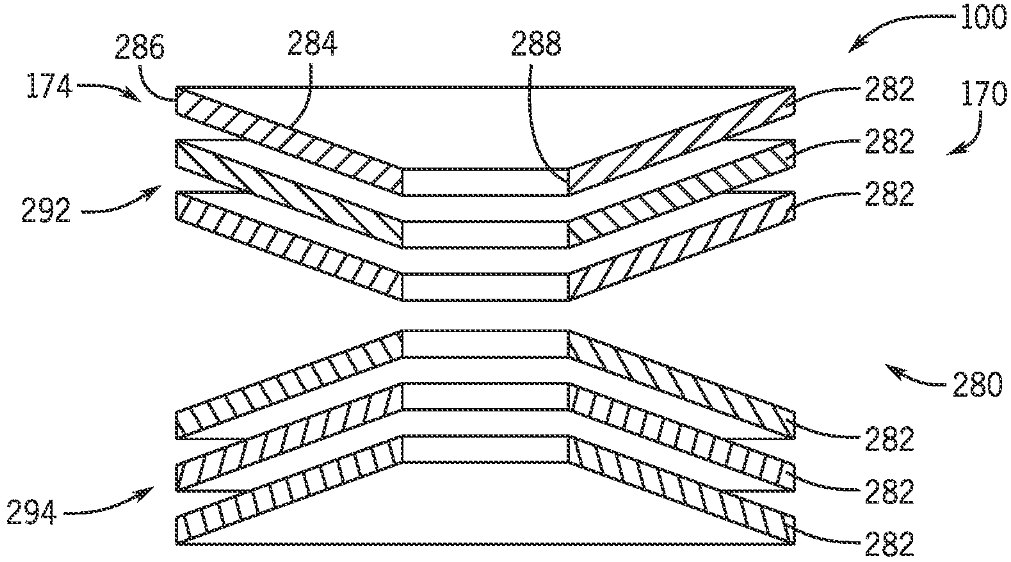
FIG. 7 is a schematic view of an embodiment of the biasing adjuster of the alignment positioner of the casing alignment system of FIGS. 1-4, illustrating the biasing adjuster including a spring (e.g., a Belleville washer assembly)

FIG. 7 is a schematic of an embodiment of the biasing adjuster 170 of the alignment positioner 100, illustrating an embodiment of the spring 174. As illustrated, the spring 174 includes a Belleville washer assembly 280 having a plurality of Belleville washers 282. The Belleville washers 282 each include a conical shaped wall 284 extending from an outer annular edge 286 to an inner annular bore 288. The Belleville washer assembly 280 may arrange the plurality of Belleville washers 282 in a variety of configurations, such as a first set 292 of the Belleville washers 282 facing a second set 294 of the Belleville washers 282. The first set 292 has the conical shaped wall 284 extending outwardly away from the inner bore 288 in a direction away from the second set 294, while the second set 294 has the conical shaped wall 284 extending outwardly away from the inner bore 288 in a direction away from the first set 292. However, the Belleville washer assembly 280 may include any number and arrangement of Belleville washers 282. In certain embodiments, the springs 174 (e.g., coil shaped springs 260, leaf springs 270, and Belleville washers 282) may be used in combination with one another, e.g., in series and/or parallel arrangements.

Figure 8:
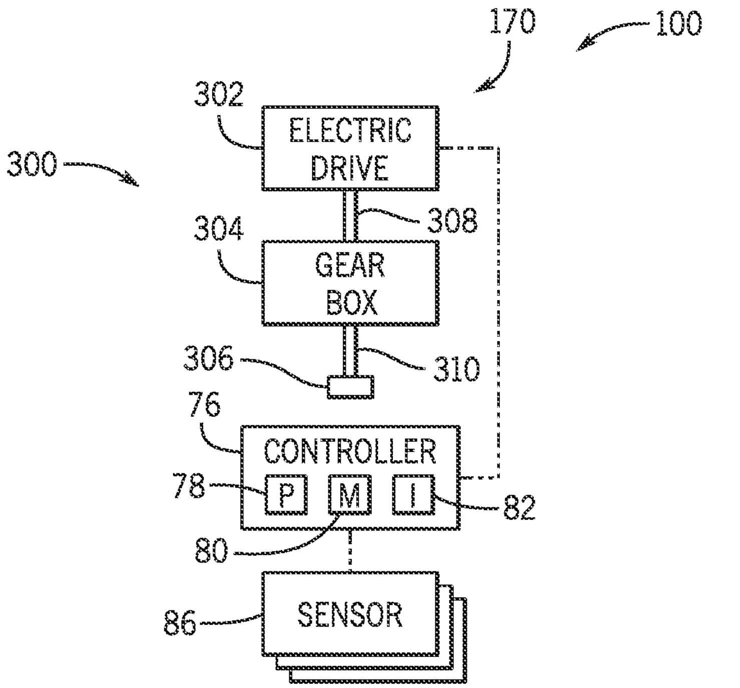
FIG. 8 is a schematic view of an embodiment of the biasing adjuster of the alignment positioner of the casing alignment system of FIGS. 1-4, illustrating the biasing adjuster including an electric-driven alignment positioner or biasing adjuster.

FIG. 8 is a schematic of an embodiment of a biasing adjuster 170 of the alignment positioner 100 of FIGS. 1-4, further illustrating an electric-driven alignment positioner or biasing adjuster 300. The biasing adjuster 300 includes an electric drive 302 coupled to a gear box 304, which in turn is coupled to a biasing plate 306. For example, the electric drive 302 may include an AC motor, a DC motor, or a combination thereof. The electric drive 302 may be coupled to the gear box 304 with a shaft 308, while the gear box 304 may be coupled to the biasing plate 306 with a shaft 310. The gear box 304 may include a plurality of gears configured to change a gear ratio to provide a mechanical advantage to drive the biasing plate 306. The electric drive 302 also may be coupled to the controller 76 of the control system 14, which may be configured to actuate the electric drive 302 in response to feedback from the sensors 86. Accordingly, during operation of the gas turbine system 10, the controller 76 may trigger operation of the electric drive 302 to move the biasing plate 306 to provide adjustments of the lip 152 as discussed in detail above.

Figure 9:
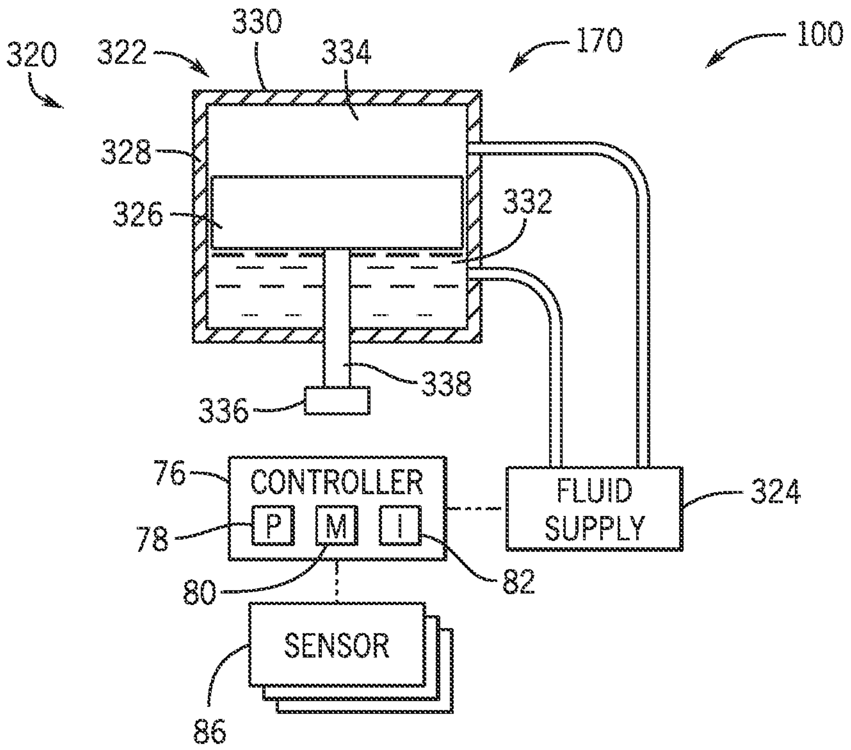
FIG. 9 is a schematic view of an embodiment of the biasing adjuster of the alignment positioner of the casing alignment system of FIGS. 1-4, illustrating the biasing adjuster including a fluid-driven alignment positioner or biasing adjuster.

FIG. 9 is a schematic of an embodiment of the biasing adjuster 170 of the alignment positioner 100 as discussed with detail above with reference to FIGS. 1-4. In the illustrated embodiment, the biasing adjuster 170 may include a fluid-driven alignment positioner or biasing adjuster 320, which includes a piston cylinder assembly 322 coupled to a fluid supply 324. For example, the piston cylinder assembly 322 includes a piston 326 disposed in a cylinder 328 of a housing 330, wherein the piston 326 separates the cylinder 328 between chambers 332 and 334. The fluid supply 324 may include a fluid tank, a fluid pump or compressor, one or more fluid valves, or any combination thereof, configured to control a flow of fluid into the chamber 332 or the chamber 334. The fluid supply 324 may be controlled by the controller 76 in response to feedback from the sensors 86, thereby providing fluid pressure into the chamber 332 to move the piston 326 upwardly or into the chamber 334 to move the piston 326 downwardly to control the position of a biasing plate 336. The biasing plate 336 is coupled to the piston 326 via a shaft 338, and the biasing plate 336 may be coupled to the lip 152 as discussed above. In operation, the fluid supply 324 is controlled by the controller 76 to force movement of the piston 326, thereby driving the biasing plate 336 to move the lip 152 and the inner wall 106 to improve alignment between the outer and inner walls 104 and 106.

Figure 10:
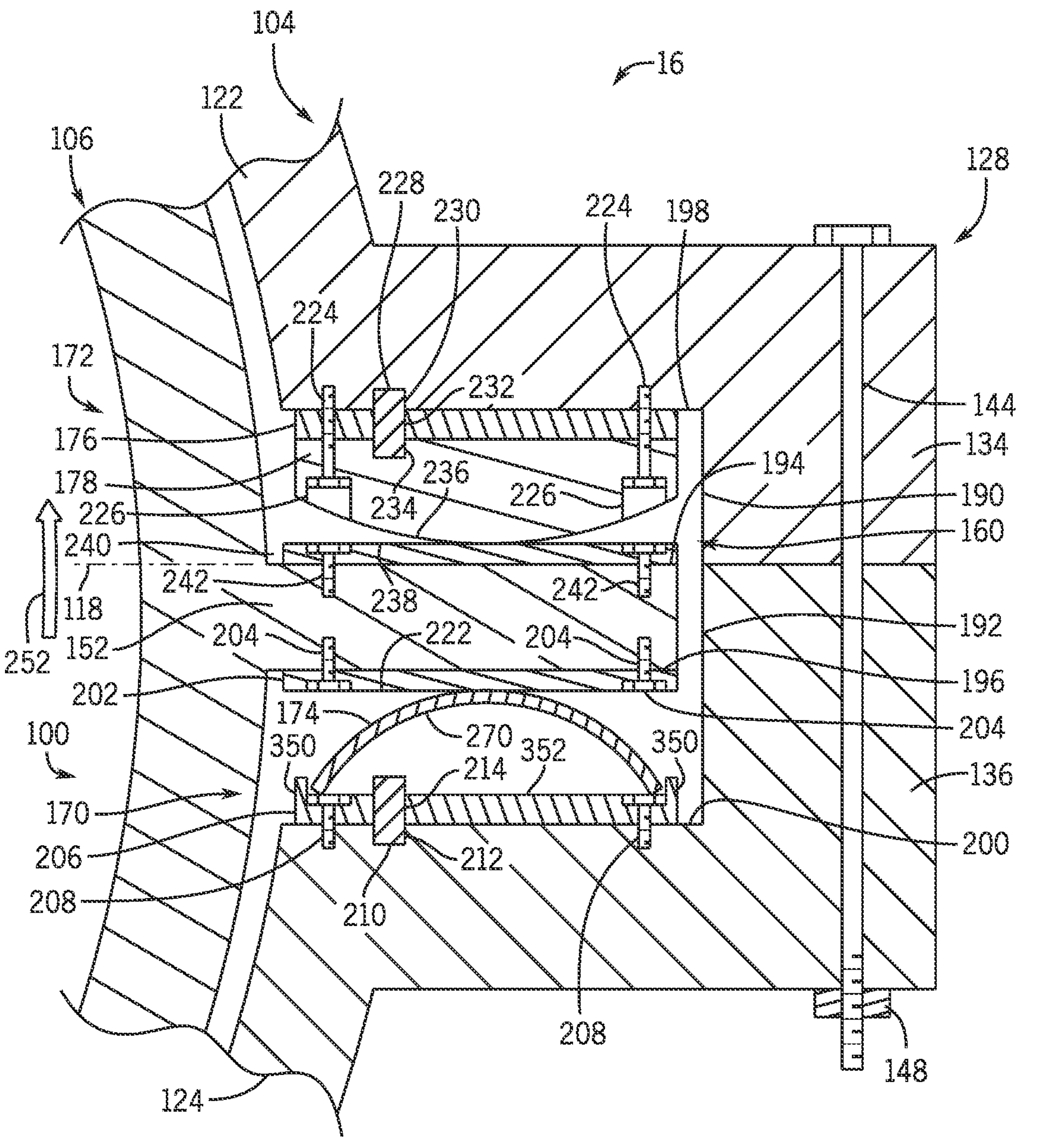
FIG. 10 is a partial cross-sectional axial view of the multi-wall casing of FIGS. 2 and 4, further illustrating details of the alignment positioner at the flanged coupling, including the biasing adjuster (e.g., leaf spring) of FIG. 6.

FIG. 10 is a partial cross-sectional view of the multi-wall casing 102 of FIG. 2, further illustrating details of the casing alignment system 16 at a location along the flanged coupling 128. The components of FIG. 10 are the same as described in detail above with reference to FIGS. 1-4, unless noted otherwise. For example, the components of the flanged coupling 128, the shim assembly 172, and the lip 152 are substantially the same as discussed in detail above. By further example, the shim assembly 172 has the crowned shim 178 and the grindable shim 176 disposed in the recess portion 190, such that the crowned surface 236 contacts the flat surface 238 of the wear plate 240. The casing alignment system 16 of FIG. 10 differs from FIG. 4 in the recess portion 192, particularly with different features at the grindable shim 206 and in the replacement of the crowned shim 218 and the biasing adjuster 170 with the leaf spring 270 of FIG. 6.

As further illustrated in FIG. 10, the biasing adjuster 170 of the alignment positioner 100 includes the spring 174 in the recess portion 192 between the wear plate 202 and the grindable shim 206. In the illustrated embodiment, the grindable shim 206 includes opposite lips or protruding portions 350 disposed about a central recess 352. The spring 174 includes the leaf spring 270 having the curved plate 272 extending from a first end 274 to a second, opposite end 276, as illustrated in FIG. 6. The opposite ends 274 and 276 are disposed in the central recess 352 between the lips or protruding portions 350, while the curved plate 272 extends upwardly or outwardly away from the grindable shim 206 toward the wear plate 202. The curved plate 272 contacts the flat surface 222 of the wear plate 202, thereby applying a biasing force against the wear plate 202 to bias the lip 152 in the upward or circumferential direction 252 as discussed above with reference to FIG. 4.

Although FIG. 10 illustrates the leaf spring 270 as the biasing adjuster 170, the casing alignment system 16 may include any one or all of the biasing adjusters 170 as discussed above with reference to FIGS. 1-9. In operation, the leaf spring 270 is configured to automatically provide a pre-load or biasing force against the lip 152, thereby helping to rotate or move the inner wall 106 relative to the outer wall 104 as the torque 180 is applied during operation of the gas turbine system 10. As a result, the leaf spring 270 helps to align the inner wall 106 with the outer wall 104 via movement at the lip 152.

Figure 11:
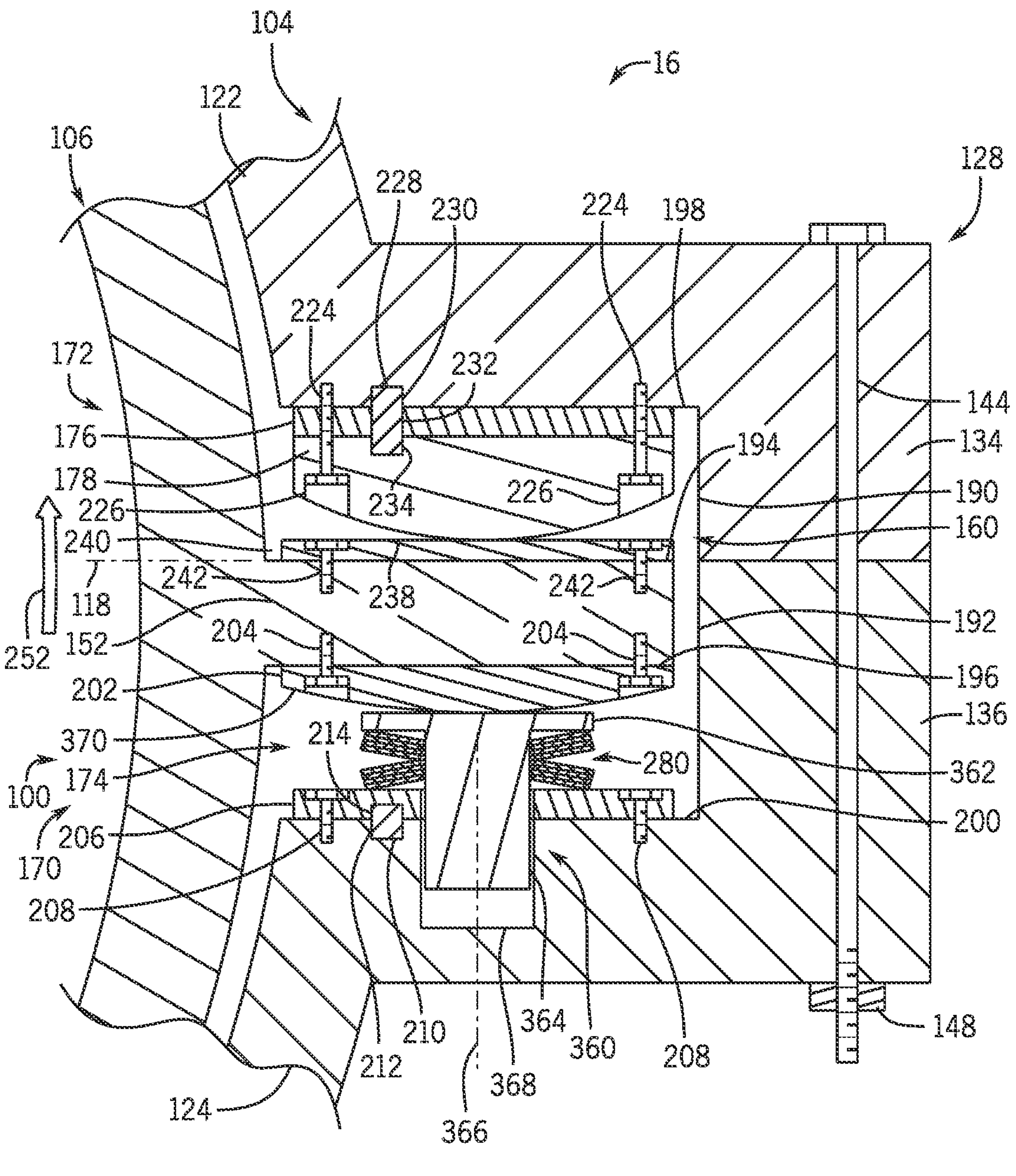
FIG. 11 is a partial cross-sectional axial view of the multi-wall casing of FIGS. 2 and 4, further illustrating details of the alignment positioner at the flanged coupling, including the biasing adjuster (e.g., Belleville washer assembly) of FIG. 7.

FIG. 11 is a partial cross-sectional view of the multi-wall casing 102 of FIG. 2, further illustrating an embodiment of the flanged coupling 128 having another biasing adjuster 170 at a location along the flanged coupling 128. The components of FIG. 11 are the same as described in detail above with reference to FIGS. 1-4, unless noted otherwise. For example, the components of the flanged coupling 128, the shim assembly 172, the lip 152, and other like elements are generally the same as discussed in detail above with reference to FIGS. 4 and 10. The casing alignment system 16 of FIG. 11 differs from FIG. 4 in the recess portion 192, particularly with different features at the grindable shim 206 and the wear plate 202 and in the replacement of the crowned shim 218 and the biasing adjuster 170 with a piston cylinder assembly 360 biased by a spring 174.

As further illustrated in FIG. 11, the biasing adjuster 170 disposed between the wear plate 202 and the grindable shim 206 in the recess portion 192 includes the piston cylinder assembly 360 biased by a spring 174, including the Belleville washer assembly 280 as discussed above with reference to FIG. 7. In the illustrated embodiment, the piston cylinder assembly 360 includes a piston or contact plate 362 coupled to a shaft 364, which is configured to move along an axis 366 in a cylinder or bore 368 in the bottom surface 200 of the recess portion 192. Accordingly, the piston or contact plate 362 can move upwardly and downwardly relative to and through the grindable shim 206, and the Belleville washer assembly 280 provides an upward biasing force of the piston or contact plate 362 against a crowned or curved surface 370 of the wear plate 202. Although the spring 174 is shown as the Belleville washer assembly 280, the spring 174 may include the coil-shaped spring 260 of FIG. 5, the leaf spring 270 of FIG. 6, or any other suitable spring type or configuration alone or in combination with the Belleville washer assembly 280.

Additionally, in certain embodiments, the shaft 364 of the piston cylinder assembly 360 may be coupled to the electric-drive alignment positioner or biasing adjuster 300 of FIG. 8 and/or the fluid-drive alignment positioner or biasing adjuster 320 of FIG. 9. In operation, as the torque 180 applied during operation of the gas turbine system 10 causes the flanged couplings 126 and 128 to partially open as indicated by openings 182 and 184 in FIG. 3, the biasing adjuster 174 having the piston cylinder assembly 360 and the spring 174 of FIG. 11 helps to bias the lip 152 and the inner wall 106 in the upward or circumferential direction 252 to compensate for any downward movement of the inner wall 106 relative to the outer wall 104. Accordingly, the biasing adjuster 170 is configured to help align central axes of the outer and inner walls 104 and 106 during operation of the gas turbine system 10.

Technical effects of the disclosed embodiments include alignment positioners of a casing alignment system configured to align inner and outer walls of a multi-wall casing of a turbomachine, such as a compressor, a turbine, or a combination thereof. The alignment positioners may include one or more biasing adjusters, such as springs, fluid-driven alignment positioners or biasing adjusters, electric-driven alignment positioners or biasing adjusters, or any combination thereof. The alignment positioners apply a biasing force to the inner wall, such as at a lip in a recess of a flanged coupling of the outer wall, thereby biasing the inner wall to move into alignment with the outer wall. For example, in response to torque produced during operation of the turbomachine, the flanged coupling may open, the inner wall may drop downwardly relative to the outer wall, and the alignment positioners may bias the inner wall to rotate and move upwardly to align the central axes of the inner and outer walls. Without such alignment positioners, the clearance between the rotor (e.g., rotary blades coupled to the rotor) and the inner wall may be non-uniform circumferentially about the rotational axis, which can reduce the efficiency and performance of the turbomachine, increase risk of a rub condition, and cause other problems during operation of the turbomachine.

The subject matter described in detail above may be defined by one or more clauses, as set forth below.

In certain embodiments, a system includes a casing alignment system configured to align an inner wall with an outer wall of a multi-wall casing of a turbomachine having a rotor. The casing alignment system includes a first alignment positioner configured to bias a first lip of the inner wall in a direction of rotation of the rotor disposed within the multi-wall casing.

The system of the preceding clause, wherein the first alignment positioner includes a spring.

The system of any preceding clause, wherein the spring includes a leaf spring.

The system of any preceding clause, wherein the spring includes one or more Belleville washers.

The system of any preceding clause, wherein the first alignment positioner includes a fluid-driven alignment positioner.

The system of any preceding clause, wherein the first alignment positioner includes an electric-driven alignment positioner.

The system of any preceding clause, including a second alignment positioner configured to bias the first lip of the inner wall in the direction of rotation of the rotor disposed within the multi-wall casing, wherein the first and second alignment positioners are different from one another.

The system of any preceding clause, including the inner wall of the multi-wall casing, wherein the inner wall includes a second lip, the first and second lips are disposed on diametrically opposite sides of the inner wall relative to a first plane extending through a rotational axis of the rotor, the first and second lips extend radially outward from the inner wall, and load faces of the first and second lips are disposed on opposite sides of the first plane.

The system of any preceding clause, wherein the first plane is a substantially horizontal plane.

The system of any preceding clause, wherein the first lip has an upper surface disposed along the first plane, and the second lip has a lower surface disposed along the first plane.

The system of any preceding clause, including the multi-wall casing having the outer wall disposed about the inner wall, wherein the outer wall includes first and second wall sections coupled together at a first flanged coupling, and the first lip of the inner wall extends radially into a first recess in the outer wall adjacent the first flanged coupling.

The system of any preceding clause, wherein the first alignment positioner includes a biasing adjuster disposed in the first recess.

The system of any preceding clause, wherein the first alignment positioner includes a biasing adjuster disposed outside of the first recess.

The system of any preceding clause, wherein the first alignment positioner includes a shaft extending from the biasing adjuster to a crowned shim in contact with the first lip inside the first recess.

The system of any preceding clause, including a turbomachine having the multi-wall casing and the casing alignment system.

The system of any preceding clause, wherein the turbomachine includes a compressor, a turbine, or both.

In certain embodiments, a method includes aligning an inner wall with an outer wall of a multi-wall casing of a turbomachine via a casing alignment system, wherein the aligning includes biasing, via a first alignment positioner of the casing alignment system, a first lip of the inner wall in a direction of rotation of a rotor of the turbomachine disposed within the multi-wall casing.

The method of the preceding clause, wherein biasing the first lip includes applying a force on the first lip within a first recess at a first flanged coupling between first and second sections of the outer wall.

The method of any preceding clause, wherein biasing the first lip includes rotating the inner wall in the direction of rotation in response to a downward vertical movement of the inner wall relative to the outer wall of the multi-wall casing.

In certain embodiments, a system may include a turbomachine having a rotor disposed within a multi-wall casing with an outer wall disposed about an inner wall. The outer wall has first and second wall sections coupled together at a first flanged coupling. The inner wall has first and second lips extending radially outward from the inner wall on diametrically opposite sides of the inner wall relative to a first plane extending through a rotational axis of the rotor, wherein load faces of the first and second lips are disposed on opposite sides of the first plane. The first lip extends radially into a first recess in the outer wall adjacent the first flanged coupling. The casing alignment system includes a first alignment positioner configured to bias the first lip of the inner wall in a direction of rotation of the rotor disposed within the multi-wall casing.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:

a casing alignment system configured to align an inner wall with an outer wall of a multi-wall casing of a turbomachine having a rotor, wherein the inner wall comprises first and second lips disposed on diametrically opposite sides of the inner wall relative to a first plane extending through a rotational axis of the rotor, the first and second lips extend radially outward from the inner wall, load faces of the first and second lips are disposed on opposite sides of the first plane, the first lip has an upper surface disposed along the first plane, and the second lip has a lower surface disposed along the first plane, wherein the casing alignment system comprises:

a first alignment positioner configured to bias the first lip of the inner wall in a direction of rotation of the rotor disposed within the multi-wall casing.

2. The system of claim 1, wherein the first alignment positioner comprises a spring.

3. The system of claim 2, wherein the spring comprises a leaf spring.

4. The system of claim 2, wherein the spring comprises one or more Belleville washers.

5. The system of claim 1, wherein the first alignment positioner comprises a fluid-driven alignment positioner.

6. The system of claim 1, wherein the first alignment positioner comprises an electric-driven alignment positioner.

7. The system of claim 1, comprising a second alignment positioner configured to bias the first lip of the inner wall in the direction of rotation of the rotor disposed within the multi-wall casing, wherein the first and second alignment positioners are different from one another.

8. The system of claim 1, wherein the first plane is a substantially horizontal plane.

9. The system of claim 1, comprising the multi-wall casing having the outer wall disposed about the inner wall, wherein the outer wall comprises first and second wall sections coupled together at a first flanged coupling, and the first lip of the inner wall extends radially into a first recess in the outer wall adjacent the first flanged coupling.

10. The system of claim 9, wherein the first alignment positioner comprises a biasing adjuster disposed in the first recess and inside of the multi-wall casing.

11. The system of claim 9, wherein the first alignment positioner comprises a biasing adjuster disposed outside of the first recess and outside of the multi-wall casing.

12. The system of claim 1, wherein the first alignment positioner comprises a shaft extending from a biasing adjuster to a crowned shim in contact with the first lip.

13. The system of claim 1, comprising a turbomachine having the multi-wall casing and the casing alignment system.

14. The system of claim 13, wherein the turbomachine comprises a compressor, a turbine, or both.

15. A system, comprising:

a turbomachine comprising a rotor disposed within a multi-wall casing having an outer wall disposed about an inner wall, wherein the outer wall comprises first and second wall sections coupled together at a first flanged coupling, the inner wall comprises first and second lips extending radially outward from the inner wall on diametrically opposite sides of the inner wall relative to a first plane extending through a rotational axis of the rotor, load faces of the first and second lips are disposed on opposite sides of the first plane, the first lip has an upper surface disposed along the first plane, and the second lip has a lower surface disposed along the first plane, and the first lip extends radially into a first recess in the outer wall adjacent the first flanged coupling; and a casing alignment system comprising a first alignment positioner configured to bias the first lip of the inner wall in a direction of rotation of the rotor disposed within the multi-wall casing.

16. The system of claim 15, wherein the casing alignment system is configured to bias the first lip of the inner wall circumferentially about the rotational axis only in the direction of rotation of the rotor.

17. The system of claim 16, wherein the casing alignment system is coupled only to the first lip but not the second lip.

18. The system of claim 15, comprising a first shim having a first curved contact surface disposed against the first lip, wherein the first alignment positioner is configured to bias the first shim against the first lip in the direction of rotation.

19. A system, comprising:

a turbomachine comprising a rotor disposed within a multi-wall casing having an outer wall disposed about an inner wall, wherein the inner wall comprises first and second lips extending radially outward from the inner wall into respective first and second recesses in the outer wall; and a casing alignment system comprising a first alignment positioner configured to bias the first lip of the inner wall in a circumferential direction about a rotational axis of the rotor, wherein the first alignment positioner is disposed at least partially outside of the multi-wall casing, wherein the first alignment positioner comprises a first biasing adjuster coupled to a first shim disposed against the first lip.

20. The system of claim 19, wherein the first biasing adjuster is disposed outside of the multi-wall casing and the first shim is disposed inside of the multi-wall casing.

21. The system of claim 20, wherein the first biasing adjuster comprises at least one of a spring, a fluid-driven positioner, an electric-driven positioner, a fluid-driven positioner, or a manual positioner.

22. The system of claim 20, wherein the first alignment positioner comprises a shaft extending through the outer wall between the first biasing adjuster and the first shim, and the first shim comprises a first curved surface disposed against the first lip.

23. A system, comprising:

a turbomachine comprising a rotor disposed within a multi-wall casing having an outer wall disposed about an inner wall, wherein the inner wall comprises first and second lips extending radially outward from the inner wall into respective first and second recesses in the outer wall; and a casing alignment system comprising a first alignment positioner configured to bias the first lip of the inner wall in a circumferential direction about a rotational axis of the rotor, wherein the first alignment positioner comprises at least one biasing adjuster coupled to a first shim via a shaft, wherein the at least one biasing adjuster is configured to bias the first shim having a first curved surface against the first lip, and the at least one biasing adjuster comprises at least one of a spring, a fluid-driven positioner, an electric-driven positioner, or a manual positioner.

24. The system of claim 23, wherein the at least one biasing adjuster comprises a first biasing adjuster disposed inside of the multi-wall casing and a second biasing adjuster disposed outside of the multi-wall casing, and the shaft extends through the outer wall.

25. The system of claim 23, wherein the at least one biasing adjuster comprises the spring.

* * * * *